(12) United States Patent
Puiu et al.

(10) Patent No.: US 10,690,198 B2
(45) Date of Patent: Jun. 23, 2020

(54) ELECTRIC MOTOR TORQUE LIMITING CLUTCH

(71) Applicant: GM Global Technology Operations LLC, Detroit, MI (US)

(72) Inventors: Dumitru Puiu, Sterling Heights, MI (US); Arthur McGrew, Jr., Indianapolis, IN (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 193 days.

(21) Appl. No.: 15/684,238

(22) Filed: Aug. 23, 2017

(65) Prior Publication Data
US 2019/0063515 A1    Feb. 28, 2019

(51) Int. Cl.
| F16D 43/21 | (2006.01) |
| H02K 7/10 | (2006.01) |
| F16D 7/08 | (2006.01) |
| F16D 7/02 | (2006.01) |
| H02K 7/108 | (2006.01) |

(52) U.S. Cl.
CPC ........... *F16D 43/215* (2013.01); *F16D 7/025* (2013.01); *F16D 7/08* (2013.01); *H02K 7/10* (2013.01); *H02K 7/108* (2013.01)

(58) Field of Classification Search
CPC ........ F16D 43/215; F16D 7/025; F16D 43/20; H02K 7/108; H02K 7/10

USPC .............. 464/36, 38, 39; 310/78, 92, 102 A
See application file for complete search history.

(56) References Cited

U.S. PATENT DOCUMENTS

| 1,874,250 A * | 8/1932 | Decker ................. B25B 23/147 464/39 |
| 4,605,111 A * | 8/1986 | Ohno ....................... B66D 3/22 464/36 |
| 9,484,794 B2 * | 11/2016 | Finkle .................... H02K 21/46 |

FOREIGN PATENT DOCUMENTS

| CH | 257168 | * 3/1949 | ..................... 464/36 |
| CN | 104321954 A | 1/2015 | |
| GB | 607.603 | * 9/1948 | |

* cited by examiner

*Primary Examiner* — Greg Binda
(74) *Attorney, Agent, or Firm* — Harness, Dickey & Pierce, P.L.C.

(57) ABSTRACT

An electric motor includes a housing and a stator mounted to the housing. A rotor is rotatably supported relative to the stator and a drive shaft is connected to the rotor by a torque limiting clutch disposed within the housing. The electric motor with a torque limiting clutch eliminates high torque episodes due to slippery driving conditions. Also, a torque limiting clutch that features a ball-ramp device with two ramp angles performs the function of a two stage torsional vibration damper. An electric motor can have a specific torque signature that can excite certain vibration modes inside the transmission that can create noise, vibration and harshness (NVH) and durability concerns.

6 Claims, 8 Drawing Sheets

ELECTRIC MOTOR TORQUE LIMITING CLUTCH

FIELD

The present disclosure relates to electric motors and more particularly to an electric motor with a torque limiting clutch.

BACKGROUND

This section provides background information related to the present disclosure which is not necessarily prior art.

Most automobiles in current use are driven by fuel engines, which experience a great deal of mechanical loss and have low energy efficiency, thereby consuming a lot of energy. As battery technology has improved, the popularity of hybrid electric and electric vehicles has increased over the last several years. However, the traditional vehicle drive train utilizing electric motors are subject to high discreet torques seen during ice maneuver events. These high torques require the components of the drive train to be designed to withstand these high torques. Accordingly, the size of the drive components are designed to be larger and therefore heavier than necessary for normal operation. Accordingly, it is desirable to provide an electric drive unit that has the ability to limit the high torques seen in conventional drives.

SUMMARY

This section provides a general summary of the disclosure, and is not a comprehensive disclosure of its full scope or all of its features.

An electric motor for an electric drive train of a vehicle includes a housing and a stator mounted to the housing. A rotor is rotatably supported relative to the stator and a drive shaft is connected to the rotor by a torque limiting clutch. The torque limiting clutch is disposed within the housing.

Also, a torque limiting clutch that features a ball ramp device with two ramp angles performs the function of a two stage torsional vibration damper that can help to avoid noise, vibration and harshness (NVH) and durability concerns.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
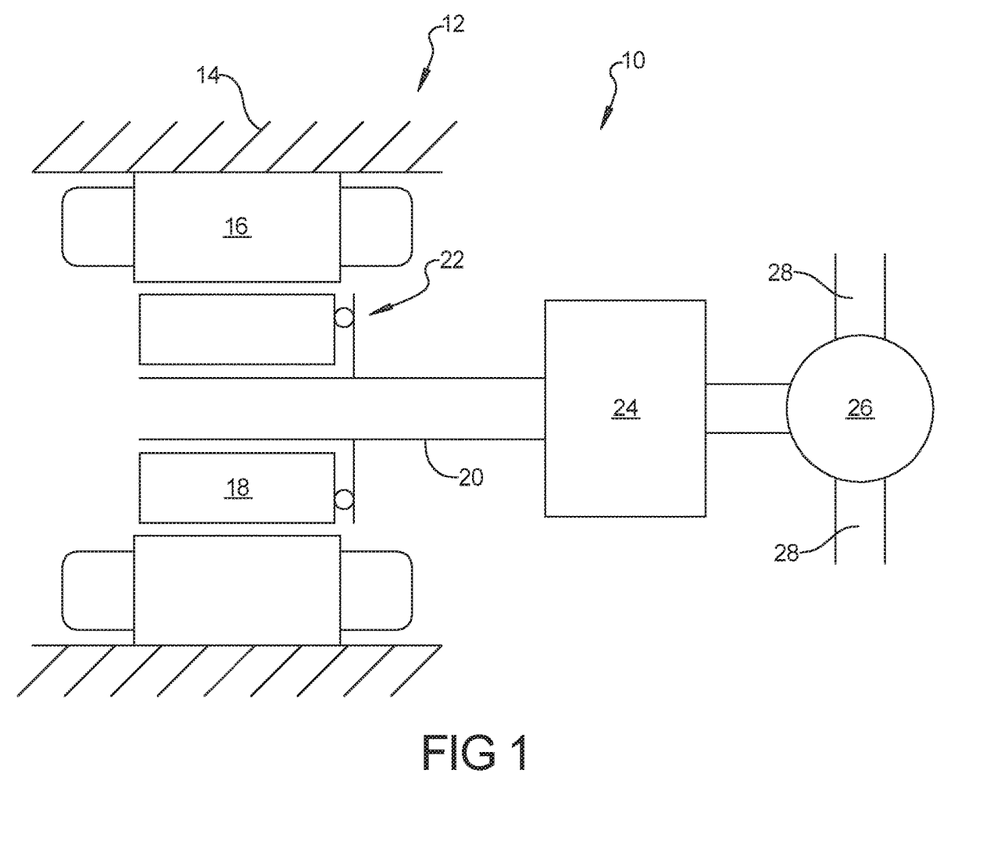
FIG. 1 is a schematic illustration of an electric motor with a torque limiting clutch according to the principles of present disclosure.

With reference to FIG. 1, a powertrain for an electric or hybrid electric vehicle 10 is shown and includes an electric motor 12 having a housing 14. A stator 16 is mounted to the housing 14 and a rotor 18 is rotatably supported inside the annular stator 16. Driveshaft 20 is drivingly connected to the rotor 18 by a torque limiting clutch 22 that is also disposed in the housing 14, as shown in FIG. 1. The driveshaft 20 of the electric motor 12 can be connected to a gear train system 24, such as a planetary gear system, which provides drive torque to a differential 26 and axle drive system 28.

Figure 2:
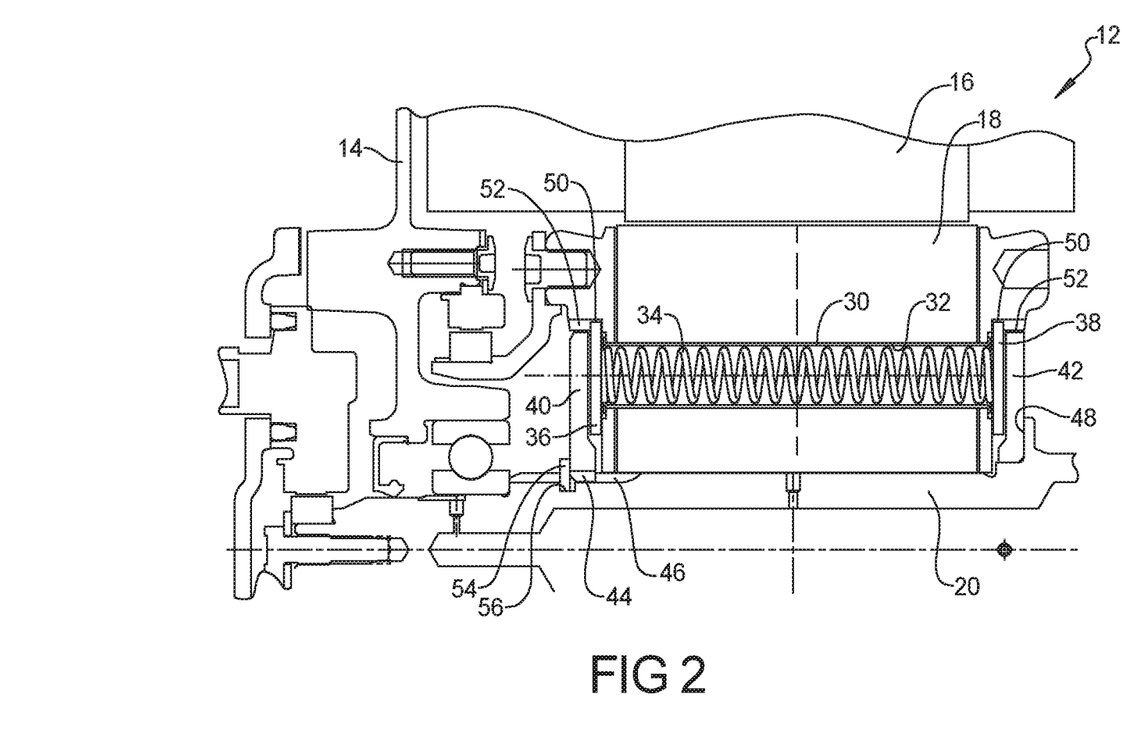
FIG. 2 is a partial cross-sectional view of an electric motor having a torque limiting clutch according to a first embodiment.

With reference to FIG. 2, a partial cross-sectional view of an electric motor 12 having a torque limiting clutch 22 will now be described. The electric motor 12 includes a stator 16 and a rotor 18 rotatably mounted relative to the stator 16. The rotor 18 includes a plurality of tubular rivets 30 extending axially through a plurality of holes 32 in the rotor 18. The tubular rivets 30 each house a compression spring 34 which are each compressed therein and are disposed against a pair of clutch plates 36, 38 disposed at opposite ends of the rotor 18. The clutch plates 36, 38 press against a pair of reaction plates 40, 42, at least one of which (reaction plate 40) includes internal splines 44 that engage external splines 46 of the drive shaft 20. The reaction plate 42 is disposed against a shoulder 48 of the drive shaft 20. The clutch plates 36, 38 each include external splines 50 which are engaged with internal splines 52 of the rotor 18 so that the clutch plates rotate with the rotor 18. A clamp ring 54 is received in a recess 56 in the drive shaft 20 and supports an outboard side of the reaction plate 40. The compression springs 34 maintain a desired friction force between the clutch plates 36, 38 and the reaction plates 40, 42. When the friction force is exceeded, the torque limiting clutch 22 slips to limit the amount of torque transmitted to the drive train.

Figure 3:
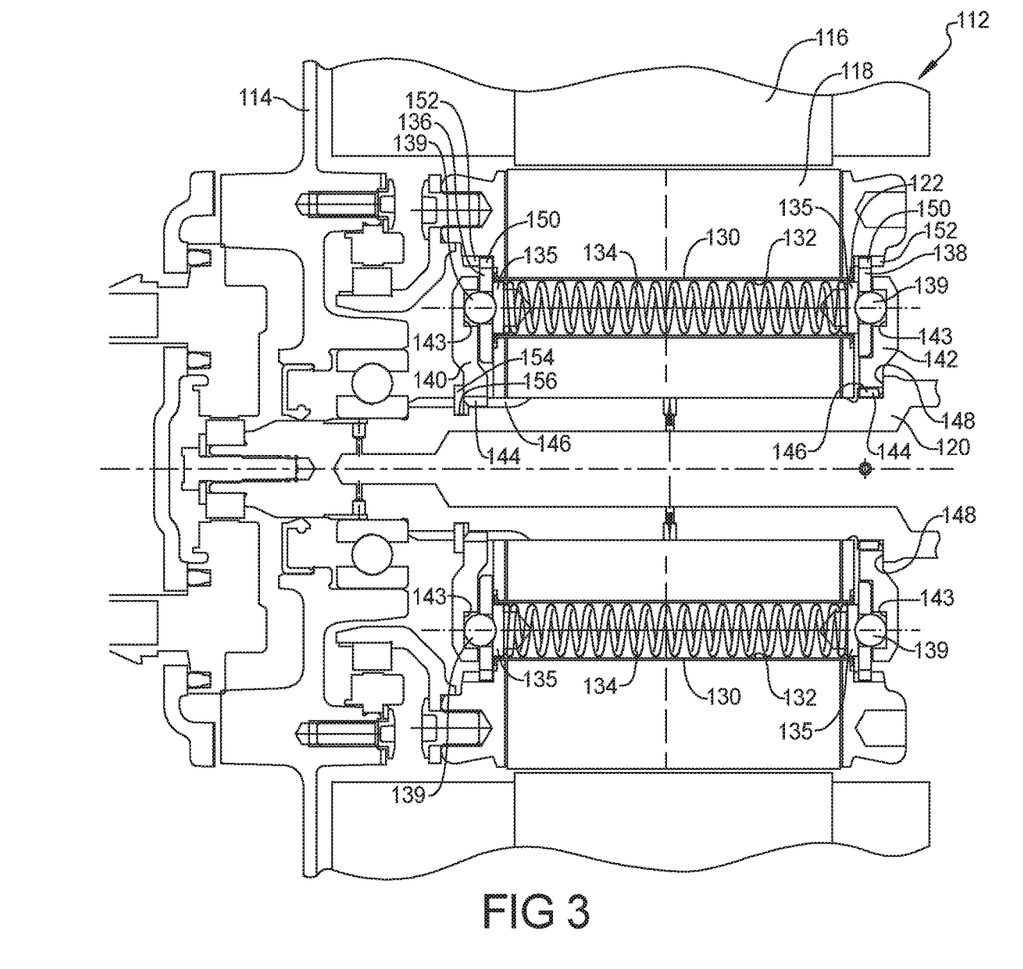
FIG. 3 is a partial cross-sectional view of an electric motor having a torque limiting clutch according to a second embodiment.

With reference to FIG. 3 a cross-sectional view of an alternative electric motor 112 having a torque limiting clutch 122 will now be described. The electric motor 112 includes a stator 116 mounted within a housing 114 and a rotor 118 rotatably mounted relative to the stator 116. The rotor 118 includes a plurality of tubular rivets 130 extending axially through a plurality of holes 132 in the rotor 118. The tubular rivets 130 each house a compression spring 134 which are each compressed therein between presser plates 135 which are disposed against a pair of ball retainer plates 136, 138 disposed at opposite ends of the rotor 118. The ball retainer plates 136, 138 each support a plurality of balls 139 in engagement with a ramp surface 143 of a respective one of a pair of ramp plates 140, 142. The pair of ramp plates 140,142 each include internal splines 144 that engage external splines 146 of the drive shaft 120. The ramp plate 142 is disposed against a shoulder 148 of the drive shaft 120. The ball retainer plates 136, 138 each include external splines 150 which are engaged with internal splines 152 of the rotor 118 so that the ball retainer plates 136, 138 rotate with the rotor 118. A clamp ring 154 is received in an annular recess 156 in the drive shaft 120 and supports an outboard side of the ramp plate 140. The compression springs 134 maintain a desired engagement force between the ball retainer plates 136, 138 and the ramp plates 140, 142. When the engagement force is exceeded, the torque limiting clutch 122 slips to limit the amount of torque transmitted to the drive train.

Figure 4:
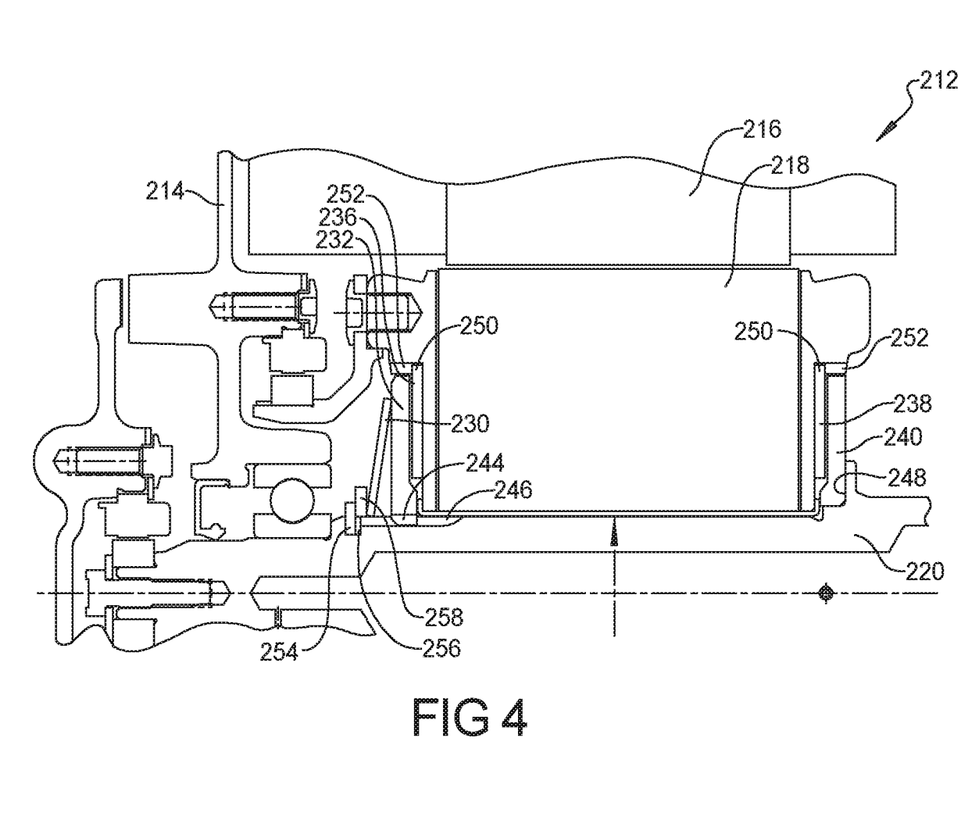
FIG. 4 is a partial cross-sectional view of an electric motor having a torque limiting clutch according to a third embodiment.

With reference to FIG. 4, a partial cross-sectional view of an alternative electric motor 212 having a torque limiting clutch 222 will now be described. The electric motor 212 includes a stator 216 disposed within a housing 214 and a rotor 218 rotatably mounted relative to the stator 216. A Belleville spring 230 is disposed against a presser plate 232 which is engaged with a first clutch plate 236 at a first end of the rotor 218. A second clutch plate 238 is disposed at a second end of the rotor 218 and is disposed against a reaction plate 240. The presser plate 232 includes internal splines 244 that engage external splines 246 of the drive shaft 220. The reaction plate 240 is disposed against a shoulder 248 of the drive shaft 220. The first and second clutch plates 236, 238 each include external splines 250 which are engaged with internal splines 252 of the rotor 218 so that the clutch plates 236, 238 each rotate with the rotor 218. A clamp ring 254 is received in a recess 256 in the drive shaft 220 and supports an outboard side of the Belleville spring 230. A washer 258 can be used between the clamp ring 254 and the Belleville spring 230 to ensure a nominal loading of the clutch. The Belleville spring 230 maintains a desired friction force between the clutch plates 236, 238 and the presser plate 232 and the reaction plate 240. When the friction force is exceeded, the torque limiting clutch 222 slips to limit the amount of torque transmitted to the drive train.

Figure 5:
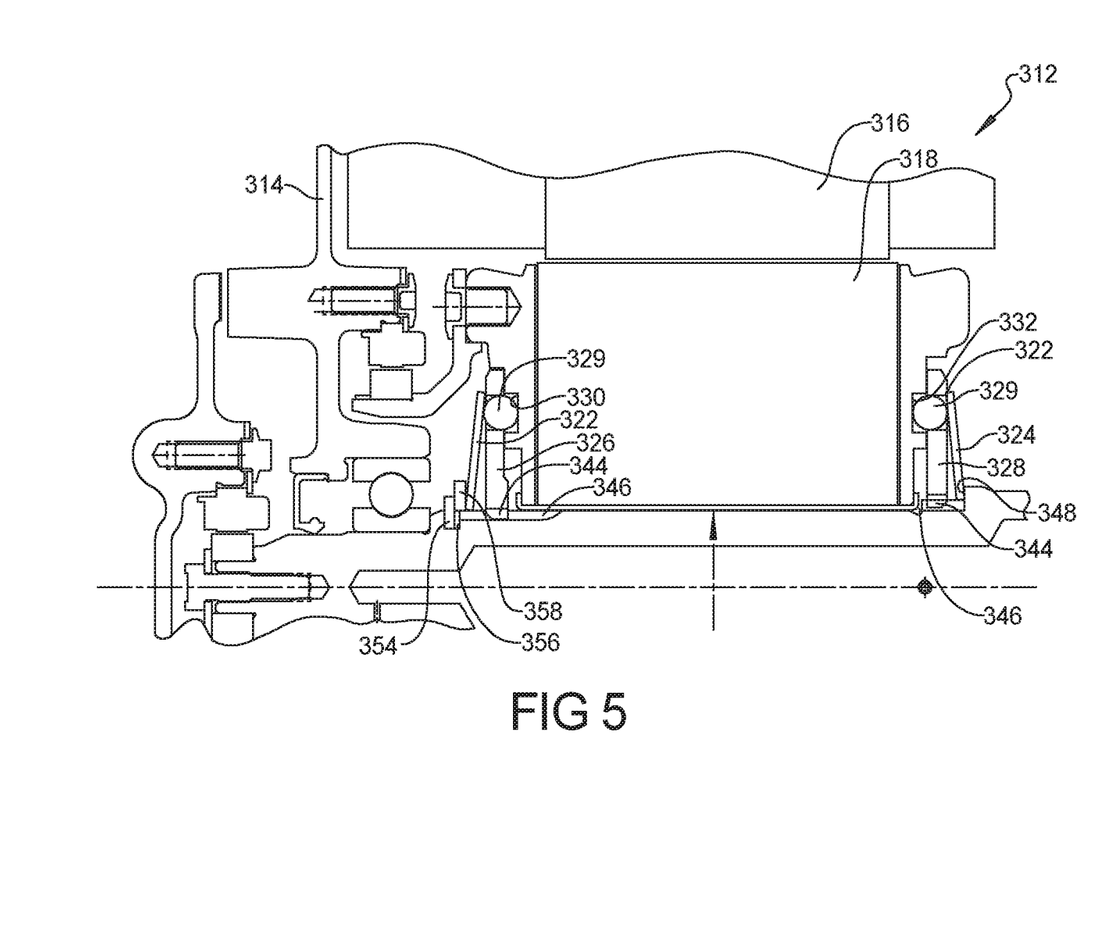
FIG. 5 is a partial cross-sectional view of an electric motor having a torque limiting clutch according to a fourth embodiment.

With reference to FIG. 5, a partial cross-sectional view of an alternative electric motor 312 having a torque limiting clutch 322 will now be described. The electric motor 312 includes a stator 316 disposed within a housing 314 and a rotor 318 rotatably mounted relative to the stator 316. A pair of Belleville springs 322, 324 are each disposed against a respective ball retainer plates 326, 328 which each support a plurality of balls 329 in engagement with corresponding ramp surfaces 330, 332 at opposite ends of the rotor 318. The ball retainer plates 326, 328 each include internal splines 344 that engage external splines 346 of the drive shaft 320. The Belleville spring 324 is disposed against a shoulder 348 of the drive shaft 320. A clamp ring 354 is received in a recess 356 in the drive shaft 320 and supports an outboard side of the Belleville spring 322. A washer 358 can be used between the clamp ring 354 and the Belleville spring 322 to ensure a nominal loading of the clutch. The Belleville springs 322, 324 maintain a desired engagement force between the ball retainer plates 326, 328 and the ramp surfaces 330, 332. When the engagement force is exceeded, the torque limiting clutch 322 slips to limit the amount of torque transmitted to the drive train.

Figure 6:
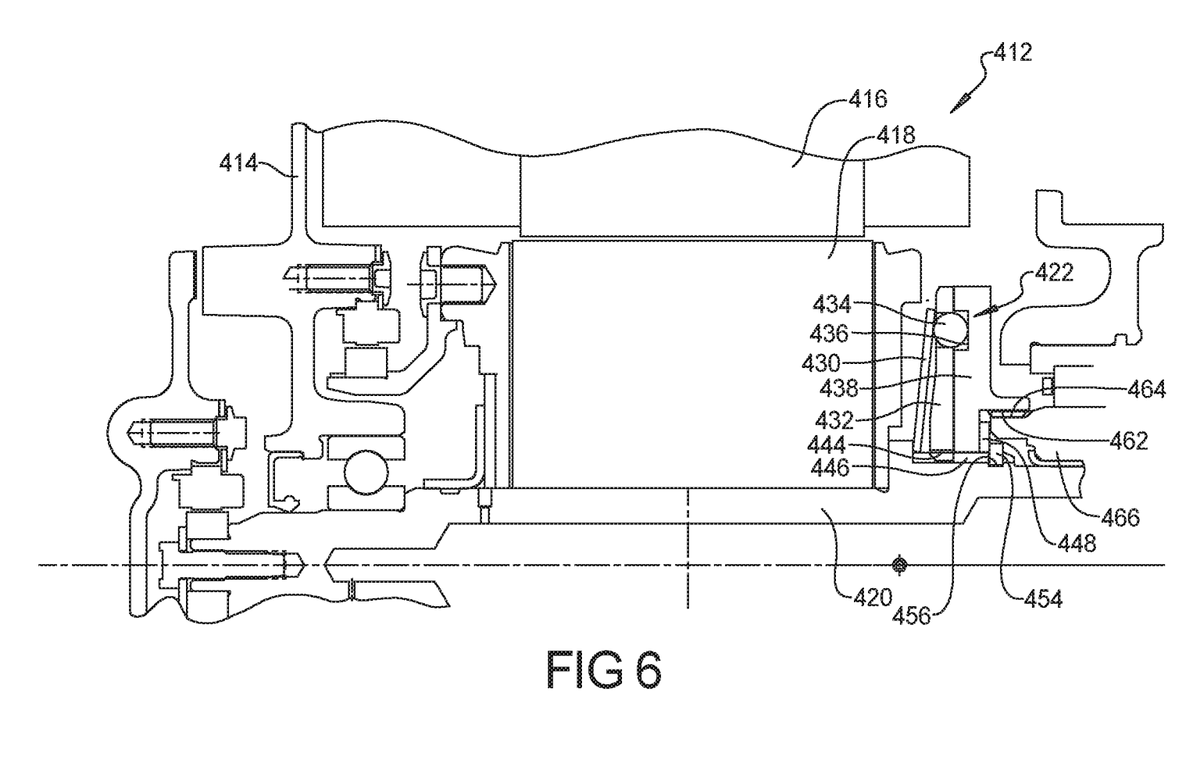
FIG. 6 is a partial cross-sectional view of an electric motor having a torque limiting clutch according to a fifth embodiment.

With reference to FIG. 6, a partial cross-sectional view of an alternative electric motor 412 having a torque limiting clutch 422 will now be described. The electric motor 412 includes a stator 416 disposed within a housing 414 and a rotor 418 rotatably mounted relative to the stator 416. The rotor 418 is fixedly attached to the drive shaft 420. A Belleville spring 430 is disposed against a ball retainer plate 432 which supports a plurality of balls 434 in engagement with corresponding ramp surfaces 436 of a ramp plate 438. The ball retainer plate 432 includes internal splines 444 that engage external splines 446 of the drive shaft 420. The ramp plate 438 is disposed against a washer 448. A clamp ring 454 is received in a recess 456 in the drive shaft 420 and thereby supports an outboard side of the ramp plate 438. The ball retainer plate 432 includes internal splines 450 which are engaged with external splines 452 of the drive shaft 420. The ramp plate 438 includes internal splines 462 that engage external splines 464 of a secondary shaft 466. The Belleville spring 430 maintains a desired engagement force between the ball retainer plate 432 and the ramp plate 438. When the engagement force is exceeded, the torque limiting clutch 422 slips to limit the amount of torque transmitted to the drive train.

Figure 7A:
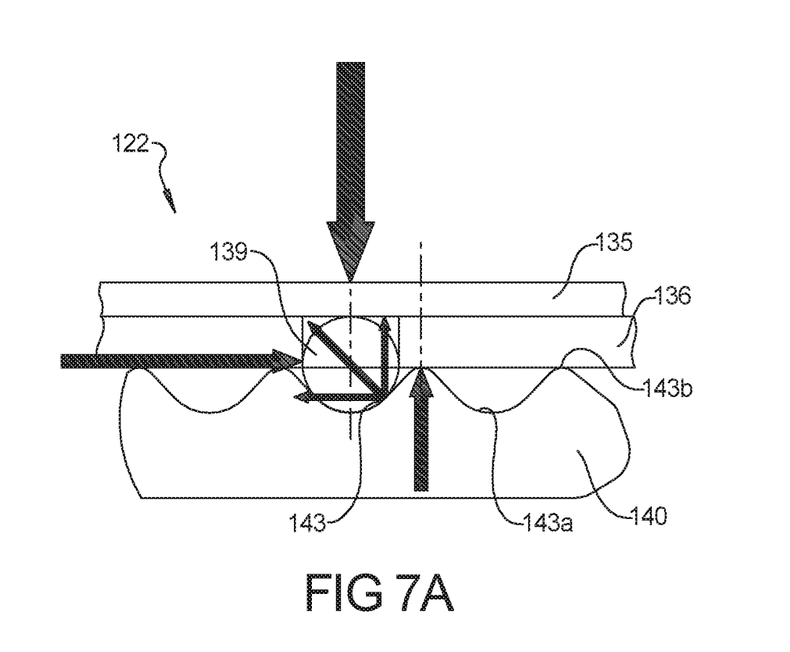
FIGS. 7A, 7B are cross-sectional views of an exemplary ball ramp style torque limiting clutch according to the principles of present disclosure.
Figure 7B:
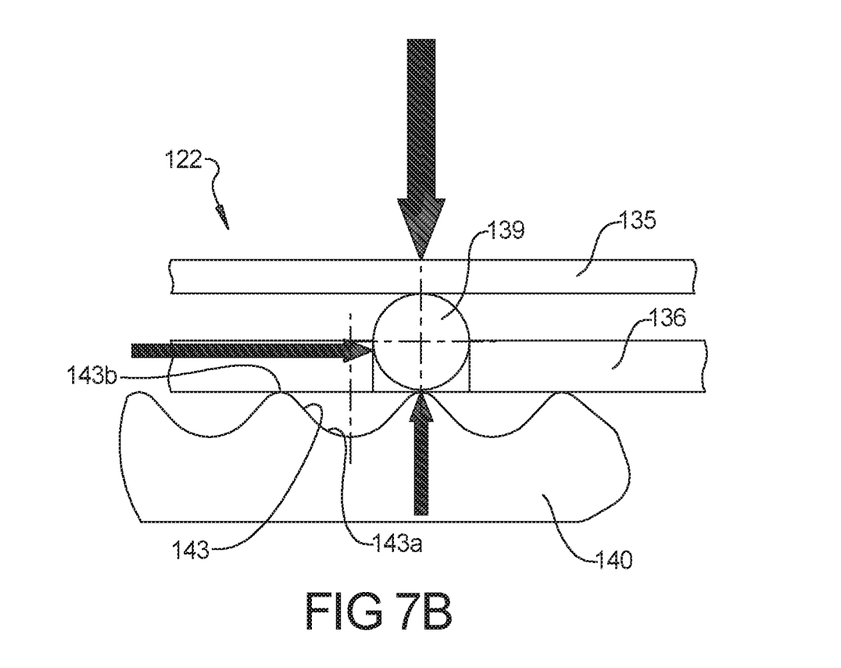

FIGS. 7A, 7B are an exemplary illustration of the ball-ramp torque limiting clutch 122 in which the ball retainer plate 136 supports the balls 139 against the ramp surface 143 of the ramp plate 140. FIG. 7A shows the balls 139 received in a valley portion 143a of the ball ramp surface 143. When torque is applied to the clutch, the spring will compress during the torque/load increase allowing the balls to go over the ramps. FIG. 7B shows the balls ball 139 going over the peak 143b of the ramp surface 143. The ramp angle and radial location and the spring preload and spring rate determine the clutch torque limiting capacity.

Figure 8A:
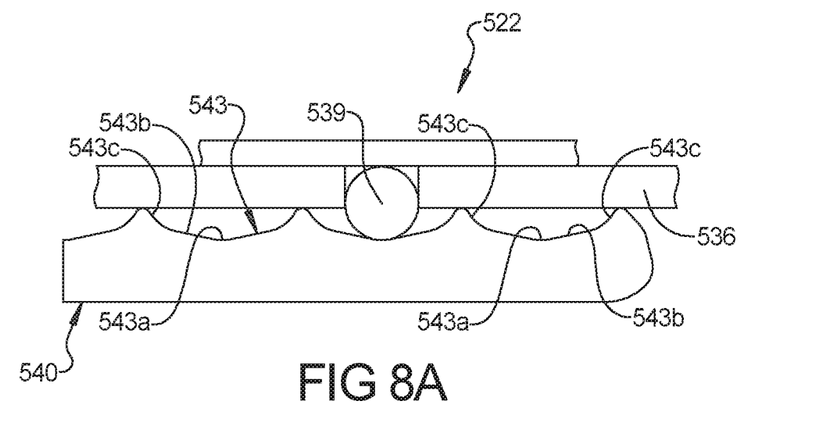
FIGS. 8A-8C are cross-sectional views of a ball ramp style torque limiting clutch having a torsional compliant ramp according to the principles of the present disclosure.
Figure 8B:
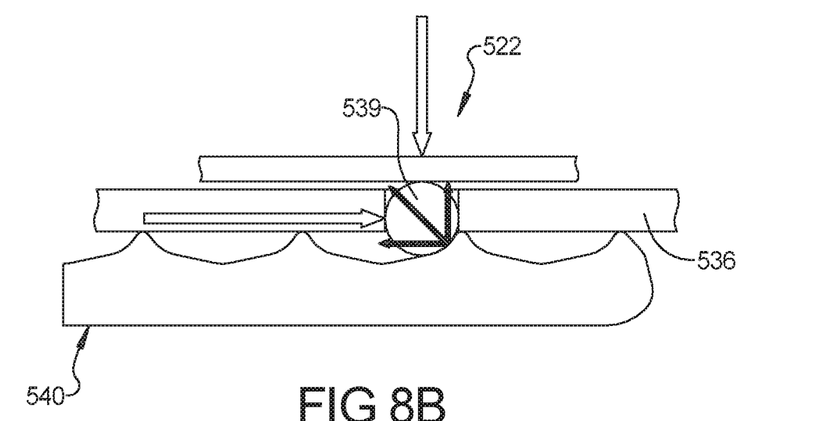
Figure 8C:
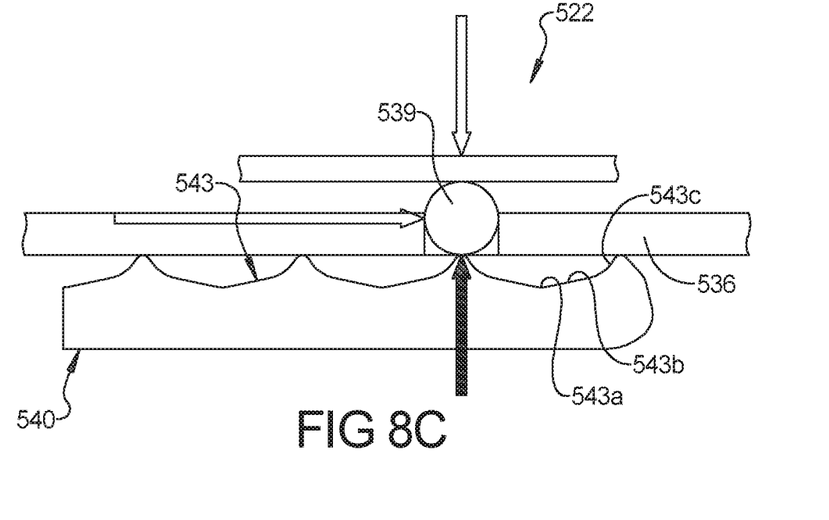

FIGS. 8A-8C are an exemplary illustration of an alternative ball-ramp torque limiting clutch 522 in which the ball retainer plate 536 supports the balls 539 against the ramp surface 543 of the ramp plate 540. The ramp surface 543 includes two ramp angles 543b, 543c designed to provide torsional compliance below the torque/load limiting range. The first ramp angle 543b is very small and allows low motor torque level oscillations to be dampened. The larger ramp angle 543c determines the torque limiting range. FIG. 8A shows the balls 539 received in a valley portion 543a of the ball ramp surface 543. When torque is applied to the clutch, the spring will compress during the torque/load increase allowing the balls to travel along the ramp surface 543. FIG. 8B shows the ball 139 going over the small ramp angle 543b of the ramp surface 143. The small ramp angle portion 543b allows bi-directional torsional vibration damping functionality. FIG. 8C shows the ball 539 going over the large ramp angle 543c of the ramp surface 543. The ramp angle and radial location and the spring preload and spring rate determine the clutch torque limiting capacity.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric motor, comprising:
 a housing;
 a stator mounted to the housing;
 a rotor rotatably supported relative to the stator;
 a drive member connected to the rotor by a torque limiting clutch, wherein the torque limiting clutch includes a ball ramp mechanism, wherein the ball ramp mechanism includes a pair of ramp plates having a ramp surface disposed on opposite sides of the rotor.

2. The electric motor according to claim 1, wherein the torque limiting clutch includes a plurality of compression springs disposed within the rotor.

3. The electric motor according to claim 1, wherein the pair of ramp plates each include a ramp surface with a small angle portion and a relatively larger ramp angle portion.

4. An electric motor, comprising:
 a motor housing;
 a stator mounted to the motor housing;
 a rotor rotatably supported relative to the stator; and
 a drive member connected to the rotor by a torque limiting clutch disposed within the motor housing, wherein the torque limiting clutch includes a first ball ramp mechanism disposed at a first end of the rotor and a second ball ramp mechanism disposed at a second end of the rotor, the first and second ball ramp mechanisms each including a ball retainer plate rotatably fixed to a respective one of the first and second ends of the rotor and each supporting a plurality of balls in engagement with a ramp surface of a respective one of a pair of ramp plates that are connected to the drive member at a respective one of the first and second ends of the rotor, wherein the ball ramp mechanism further includes a plurality of springs disposed within the rotor and biasing the plurality of balls against the pair of ramp plates.

5. The electric motor according to claim 4, wherein the first and second ball ramp mechanisms each include a ramp surface with a small angle portion and a relatively larger ramp angle portion.

6. An electric motor, comprising:
 a motor housing;
 a stator mounted to the motor housing;
 a rotor rotatably supported relative to the stator; and
 a drive member connected to the rotor by a torque limiting clutch disposed within the motor housing, wherein the torque limiting clutch includes a ball ramp mechanism disposed at a first end of the rotor, the ball ramp mechanism including a ball retainer plate rotatably fixed to the first end of the rotor and supporting a plurality of balls in engagement with a ramp surface of a ramp plate disposed at the first end of the rotor, wherein the ball ramp mechanism further includes a plurality of springs disposed within the rotor and biasing the plurality of balls against the ramp plate.

* * * * *